United States Patent
Qiu et al.

(10) Patent No.: US 10,404,435 B2
(45) Date of Patent: Sep. 3, 2019

(54) PILOT SIGNAL GENERATION METHOD AND APPARATUS

(71) Applicant: HUAWEI TECHNOLOGIES CO., LTD., Shenzhen, Guangdong (CN)

(72) Inventors: Jing Qiu, Chengdu (CN); Ming Jia, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 137 days.

(21) Appl. No.: 15/603,626

(22) Filed: May 24, 2017

(65) Prior Publication Data

US 2017/0257194 A1    Sep. 7, 2017

Related U.S. Application Data

(63) Continuation of application No. PCT/CN2014/092199, filed on Nov. 25, 2014.

(51) Int. Cl.
*H04L 5/00* (2006.01)
*H04L 1/00* (2006.01)
(Continued)

(52) U.S. Cl.
CPC .......... *H04L 5/005* (2013.01); *H04B 7/0456* (2013.01); *H04L 1/00* (2013.01); *H04L 5/0051* (2013.01);
(Continued)

(58) Field of Classification Search
CPC ........................................................ H04L 1/00
(Continued)

(56) References Cited

U.S. PATENT DOCUMENTS 8,687,480 B2 * 4/2014 Jia ................ H04B 7/0671
370/208
8,817,686 B2 * 8/2014 Cai ................ H04B 7/2606
370/315
(Continued)

FOREIGN PATENT DOCUMENTS

CN    101043235 A    9/2007
CN    101273595 A    9/2008
(Continued)

OTHER PUBLICATIONS

International Search Report dated Aug. 14, 2015 in corresponding International Patent Application No. PCT/CN2014/092199.
(Continued)

*Primary Examiner* — James M Perez
(74) *Attorney, Agent, or Firm* — Staas & Halsey LLP

(57) ABSTRACT

Embodiments of the present invention provide a pilot signal generation method and apparatus, so as to implement sharing of one pilot by multiple UEs when it is ensured that each of the multiple UEs can correctly obtain a data stream, thereby reducing pilot overheads. The method includes: determining a first pilot signal shared by multiple UEs, where the multiple UEs are multiple UEs transmitting data streams on a same time-frequency resource; determining a pilot precoding vector of first UE and a data stream receiving gain of the first UE according to current downlink channel information of the multiple UEs, where the first UE is one of the multiple UEs; and generating, according to the first pilot signal, the data stream receiving gain of the first UE, and the pilot precoding vector of the first UE, a second pilot signal that is to be sent to the first UE.

9 Claims, 7 Drawing Sheets

(51) Int. Cl.
*H04L 25/02* (2006.01)
*H04B 7/0456* (2017.01)
*H04B 7/0452* (2017.01)

(52) U.S. Cl.
CPC ...... *H04L 25/0202* (2013.01); *H04L 25/0226* (2013.01); *H04B 7/0452* (2013.01)

(58) Field of Classification Search
USPC .................................. 375/259–285, 295–296
See application file for complete search history.

(56) References Cited

U.S. PATENT DOCUMENTS

| | | | | |
|---|---|---|---|---|
| 8,873,657 B2* | 10/2014 | Liu | ...................... | H04B 10/116 375/260 |
| 8,982,779 B2* | 3/2015 | Li | ........................ | H04B 7/0695 370/328 |
| 9,008,166 B2* | 4/2015 | Nakano | ............ | H04L 25/03955 375/229 |
| 9,425,934 B2* | 8/2016 | Seo | .......................... | H04L 1/06 |
| 9,503,171 B2* | 11/2016 | Yeh | ...................... | H04B 7/0469 |
| 9,537,549 B2* | 1/2017 | Bi | ........................ | H04B 7/0452 |
| 9,554,394 B2* | 1/2017 | Li | ....................... | H04L 25/0391 |
| 9,602,182 B2* | 3/2017 | Zhang | .................. | H04L 5/0035 |
| 9,900,078 B2* | 2/2018 | Wu | ........................ | H04L 1/02 |
| 10,033,550 B2* | 7/2018 | Abdoli | ............... | H04L 25/0226 |
| 10,056,955 B2* | 8/2018 | Liu | ...................... | H04B 7/0456 |
| 2005/0101259 A1* | 5/2005 | Tong | .................... | H04B 7/0417 455/69 |
| 2007/0025460 A1* | 2/2007 | Budianu | ............. | H04L 25/0204 375/260 |
| 2008/0212701 A1* | 9/2008 | Pan | ...................... | H04B 7/0417 375/260 |
| 2008/0225960 A1* | 9/2008 | Kotecha | ............... | H04B 7/0413 375/259 |
| 2010/0173639 A1* | 7/2010 | Li | ........................ | H04B 7/0695 455/450 |
| 2010/0316163 A1* | 12/2010 | Forenza | ................. | H04B 7/024 375/296 |
| 2011/0002410 A1* | 1/2011 | Forenza | ................. | H04B 7/0626 375/267 |
| 2011/0075651 A1* | 3/2011 | Jia | ........................ | H04B 7/0671 370/344 |
| 2011/0286548 A1* | 11/2011 | Safavi | .................. | H04L 5/0023 375/295 |
| 2011/0306381 A1* | 12/2011 | Jia | .......................... | H04B 7/024 455/522 |
| 2012/0113950 A1* | 5/2012 | Skov | ...................... | H04L 5/0016 370/329 |
| 2012/0182964 A1* | 7/2012 | Gao | ...................... | H04B 7/0697 370/330 |
| 2012/0202431 A1* | 8/2012 | Hawryluck | ............ | H04B 7/024 455/63.4 |
| 2013/0016680 A1* | 1/2013 | Au | ....................... | H04B 7/0452 370/329 |
| 2013/0163537 A1* | 6/2013 | Anderson | ......... | H04W 72/1284 370/329 |
| 2013/0215872 A1 | 8/2013 | Johansson et al. | | |
| 2013/0336282 A1* | 12/2013 | Nakano | ................ | H04B 7/0456 370/330 |
| 2014/0029952 A1* | 1/2014 | Liu | ...................... | H04B 10/116 398/115 |
| 2014/0064354 A1* | 3/2014 | Nakano | ............. | H04L 25/03955 375/233 |
| 2014/0192768 A1* | 7/2014 | Yeh | ...................... | H04B 7/0469 370/330 |
| 2014/0211713 A1* | 7/2014 | Ito | ......................... | H04L 5/0048 370/329 |
| 2014/0211726 A1* | 7/2014 | Jia | ........................ | H04B 7/0671 370/329 |
| 2014/0211778 A1* | 7/2014 | Jia | ........................ | H04B 7/0671 370/344 |
| 2015/0016379 A1* | 1/2015 | Nam | .................... | H04B 7/0456 370/329 |
| 2015/0163036 A1* | 6/2015 | Thomas | ................ | H04L 5/0044 370/281 |
| 2015/0372727 A1* | 12/2015 | Ribeiro | ................ | H04B 7/0456 375/267 |
| 2016/0156401 A1* | 6/2016 | Onggosanusi | ....... | H04B 7/0478 370/329 |
| 2016/0323891 A1* | 11/2016 | Zhang | ................... | H04W 88/04 |
| 2017/0041107 A1* | 2/2017 | Qiu | .......................... | H04L 1/06 |
| 2017/0047973 A1* | 2/2017 | Wu | ....................... | H04B 7/0456 |
| 2017/0078069 A1* | 3/2017 | Jia | ........................ | H04W 72/04 |
| 2017/0180020 A1* | 6/2017 | Namgoong | .......... | H04B 7/0456 |
| 2017/0257194 A1* | 9/2017 | Qiu | .......................... | H04L 1/00 |
| 2018/0199359 A1* | 7/2018 | Cao | ...................... | H04W 74/006 |

FOREIGN PATENT DOCUMENTS

| | | |
|---|---|---|
| CN | 101867533 A | 10/2010 |
| CN | 102098085 A | 6/2011 |
| CN | 103081375 A | 5/2013 |
| CN | 103546264 A | 1/2014 |

OTHER PUBLICATIONS

International Search Report dated Aug. 14, 2015 in corresponding International Application No. PCT/CN2014/092199.

Extended European Search Report dated Aug. 21, 2017 in corresponding European Patent Application No. 14906665.6.

Auer G et al.: "Pilot Design of MIMO-OFDM with Beamforming," Communications, 2009, ICC '09, IEEE International Conference on, IEEE, Piscataway, NJ, USA, Jun. 14, 2009, XP031506313.

Office Action, dated Apr. 16, 2019, in Chinese Application No. 201480082935.7 (6 pages).

* cited by examiner

PILOT SIGNAL GENERATION METHOD AND APPARATUS

CROSS-REFERENCE TO RELATED APPLICATIONS

This application is a continuation of International Application No. PCT/CN2014/092199, filed on Nov. 25, 2014, the disclosure of which is hereby incorporated by reference in its entirety.

TECHNICAL FIELD

The present invention relates to the field of communications technologies, and in particular, to a pilot signal generation method and apparatus.

BACKGROUND

In the field of communications technologies, the multi-user multiple input multiple output (English: multi-user multiple input multiple output, MU-MIMO for short) technology has become one of core technologies in wireless communications systems such as a Third Generation Partnership Project Long Term Evolution (English: Third Generation Partnership Project Long Term Evolution, 3GPP LTE for short) system. In the MU-MIMO technology, multiple user equipments (English: user equipment, UE for short) transmit data streams on a same time-frequency resource. Therefore, a different dedicated pilot signal needs to be allocated to each UE, so that the multiple UEs correctly obtain each data stream.

In an existing 3GPP LTE system, the 3GPP LTE system may support parallel transmission of eight data streams at most when correct transmission of the data streams is not affected. Therefore, a standard of the 3GPP LTE system defines eight mutually-orthogonal dedicated pilot (English: dedicated pilot) signals. When a base station transmits data streams of multiple UEs in parallel, the base station allocates a different dedicated pilot signal to each UE, multiplies each dedicated pilot signal by a precoding vector used by a data stream of UE corresponding to the dedicated pilot signal, to generate a pilot signal corresponding to the UE, and sends the pilot signal to the UE. Because the dedicated pilot signals are mutually orthogonal, each UE may not be interfered by another pilot signal when receiving the pilot signal of the UE, so that the UE may obtain equivalent channel information (which is a product of the precoding vector used by the data stream of the UE and channel information) between the UE and the base station according to the pilot signal of the UE, and demodulate, according to the equivalent channel information, a data signal received by the UE to obtain the data stream of the UE.

However, when data streams that need to be transmitted in parallel increase gradually, if a different dedicated pilot signal is still allocated to each UE, pilot overheads may increase. If a same pilot signal is allocated to multiple UEs to reduce pilot overheads, according to the foregoing pilot signal generation method, each UE may be interfered, when receiving a pilot signal of the UE, by a pilot signal of another UE, resulting in that a data stream of the UE cannot be obtained. Therefore, it is urgent to provide a pilot signal design method to implement sharing of one pilot by multiple UEs, so as to reduce pilot overheads.

SUMMARY

The present invention provides a pilot signal generation method and apparatus, so as to implement, by providing a pilot signal design method, sharing of one pilot by multiple UEs when it is ensured that each of the multiple UEs can correctly obtain a data stream, thereby reducing pilot overheads.

To achieve the foregoing objective, the present invention uses the following technical solutions.

According to a first aspect, the present invention provides a pilot signal generation method, including:

determining a first pilot signal shared by multiple user equipments UEs, where the multiple UEs are multiple UEs transmitting data streams on a same time-frequency resource;

determining a pilot precoding vector of first UE and a data stream receiving gain of the first UE according to current downlink channel information of the multiple UEs, where the first UE is one of the multiple UEs; and generating, according to the first pilot signal, the data stream receiving gain of the first UE, and the pilot precoding vector of the first UE, a second pilot signal that is to be sent to the first UE.

In a first possible implementation manner of the first aspect, the pilot precoding vector of the first UE satisfies the following conditions:

a product of the pilot precoding vector of the first UE and current downlink channel information of each of UEs other than the first UE in the multiple UEs is zero; and a product of the pilot precoding vector of the first UE and current downlink channel information of the first UE is a receive equalization vector of the first UE.

With reference to the first possible implementation manner of the first aspect, in a second possible implementation manner, before the determining a pilot precoding vector of first UE and a data stream receiving gain of the first UE according to current downlink channel information of the multiple UEs, the method further includes:

obtaining the current downlink channel information of the multiple UEs; and the determining a pilot precoding vector of first UE and a data stream receiving gain of the first UE according to current downlink channel information of the multiple UEs includes:

determining a data precoding vector of the first UE according to the current downlink channel information of the multiple UEs;

determining the receive equalization vector of the first UE according to the current downlink channel information of the first UE and the data precoding vector of the first UE;

determining the pilot precoding vector of the first UE according to the current downlink channel information of the multiple UEs and the receive equalization vector of the first UE; and determining the data stream receiving gain of the first UE according to the current downlink channel information of the first UE, the receive equalization vector of the first UE, and the data precoding vector of the first UE.

With reference to the second possible implementation manner of the first aspect, in a third possible implementation manner, the determining the pilot precoding vector of the first UE according to the current downlink channel information of the multiple UEs and the receive equalization vector of the first UE includes:

determining null space of a set of channel information of all the other UEs according to current downlink channel information of all the other UEs; and determining the pilot precoding vector of the first UE according to the receive equalization vector of the first UE, the current downlink channel information of the first UE, and the null space of the set of the channel information of all the other UEs.

With reference to any one of the first aspect, or the first possible implementation manner to the third possible implementation manner of the first aspect, in a fourth possible implementation manner, after the generating, according to the first pilot signal, the data stream receiving gain of the first UE, and the pilot precoding vector of the first UE, a second pilot signal that is to be sent to the first UE, the method further includes:

sending the second pilot signal to the first UE by using a current downlink channel of the first UE.

According to a second aspect, the present invention provides a pilot signal generation apparatus, including:

a determining unit, configured to: determine a first pilot signal shared by multiple user equipments UEs, where the multiple UEs are multiple UEs transmitting data streams on a same time-frequency resource; and determine a pilot precoding vector of first UE and a data stream receiving gain of the first UE according to current downlink channel information of the multiple UEs, where the first UE is one of the multiple UEs; and a generation unit, configured to generate, according to the first pilot signal, the data stream receiving gain of the first UE, and the pilot precoding vector of the first UE that are determined by the determining unit, a second pilot signal that is to be sent to the first UE.

In a first possible implementation manner of the second aspect, the pilot precoding vector of the first UE that is determined by the determining unit satisfies the following conditions:

a product of the pilot precoding vector of the first UE and current downlink channel information of each of UEs other than the first UE in the multiple UEs is zero; and a product of the pilot precoding vector of the first UE and current downlink channel information of the first UE is a receive equalization vector of the first UE.

With reference to the first possible implementation manner of the second aspect, in a second possible implementation manner, the generation apparatus further includes an obtaining unit, where the obtaining unit is configured to obtain the current downlink channel information of the multiple UEs; and the determining unit is specifically configured to: determine a data precoding vector of the first UE according to the current downlink channel information of the multiple UEs that is obtained by the obtaining unit; determine the receive equalization vector of the first UE according to the current downlink channel information of the first UE and the data precoding vector of the first UE; determine the pilot precoding vector of the first UE according to the current downlink channel information of the multiple UEs and the receive equalization vector of the first UE; and determine the data stream receiving gain of the first UE according to the current downlink channel information of the first UE, the receive equalization vector of the first UE, and the data precoding vector of the first UE.

With reference to the second possible implementation manner of the second aspect, in a third possible implementation manner, the determining unit is specifically configured to: determine null space of a set of channel information of all the other UEs according to current downlink channel information of all the other UEs; and determine the pilot precoding vector of the first UE according to the receive equalization vector of the first UE, the current downlink channel information of the first UE, and the null space of the set of the channel information of all the other UEs.

With reference to any one of the second aspect, or the first possible implementation manner to the third possible implementation manner of the second aspect, in a fourth possible implementation manner, the generation apparatus further includes a sending module, where the sending unit is configured to send, after the generation unit generates the second pilot signal, the second pilot signal generated by the generation unit to the first UE by using a current downlink channel of the first UE.

According to a third aspect, the present invention provides a base station, including:

a processor, configured to: determine a first pilot signal shared by multiple user equipments UEs, where the multiple UEs are multiple UEs transmitting data streams on a same time-frequency resource, determine a pilot precoding vector of first UE and a data stream receiving gain of the first UE according to current downlink channel information of the multiple UEs, where the first UE is one of the multiple UEs; and generate, according to the first pilot signal, the data stream receiving gain of the first UE, and the pilot precoding vector of the first UE, a second pilot signal that is to be sent to the first UE.

In a first possible implementation manner of the third aspect, the pilot precoding vector of the first UE that is determined by the processor satisfies the following conditions:

a product of the pilot precoding vector of the first UE and current downlink channel information of each of UEs other than the first UE in the multiple UEs is zero; and a product of the pilot precoding vector of the first UE and current downlink channel information of the first UE is a receive equalization vector of the first UE.

With reference to the first possible implementation manner of the third aspect, in a second possible implementation manner, the processor is specifically configured to: obtain the current downlink channel information of the multiple UEs; determine a data precoding vector of the first UE according to the current downlink channel information of the multiple UEs; determine the receive equalization vector of the first UE according to the current downlink channel information of the first UE and the data precoding vector of the first UE; determine the pilot precoding vector of the first UE according to the current downlink channel information of the multiple UEs and the receive equalization vector of the first UE; and determine the data stream receiving gain of the first UE according to the current downlink channel information of the first UE, the receive equalization vector of the first UE, and the data precoding vector of the first UE.

With reference to the second possible implementation manner of the third aspect, in a third possible implementation manner, the processor is specifically configured to: determine null space of a set of channel information of all the other UEs according to current downlink channel information of all the other UEs; and determine the pilot precoding vector of the first UE according to the receive equalization vector of the first UE, the current downlink channel information of the first UE, and the null space of the set of the channel information of all the other UEs.

With reference to any one of the third aspect, or the first possible implementation manner to the third possible implementation manner of the third aspect, in a fourth possible implementation manner, the base station further includes a transceiver, where the transceiver is configured to send, after the processor generates the second pilot signal, the second pilot signal generated by the processor to the first UE by using a current downlink channel of the first UE.

The present invention provides a pilot signal generation method and apparatus. The method specifically includes: determining, by a base station, a first pilot signal shared by multiple UEs, where the multiple UEs are multiple UEs transmitting data streams on a same time-frequency resource; determining a pilot precoding vector of first UE and a data stream receiving gain of the first UE according to current downlink channel information of the multiple UEs, where the first UE is one of the multiple UEs; and generating, by the base station according to the first pilot signal, the data stream receiving gain of the first UE, and the pilot precoding vector of the first UE, a second pilot signal that is to be sent to the first UE. According to the method, when multiple UEs transmitting data streams on a same time-frequency resource share a pilot, each UE is not interfered, when receiving a pilot signal of the UE, by a pilot signal of another UE, thereby ensuring that each of the multiple UEs can correctly obtain, according to the pilot signal of the UE, a data stream of the UE, implementing sharing of one pilot by the multiple UEs, and further reducing pilot overheads.

BRIEF DESCRIPTION OF DRAWINGS

To describe the technical solutions in the embodiments of the present invention more clearly, the following briefly describes the accompanying drawings required for describing the embodiments. Apparently, the described embodiments are merely some but not all of the embodiments of the present invention.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention.

In an MU-MIMO system, data streams of k (k=1, 2, . . . , k) UEs may be transmitted on a same time-frequency resource in a space division multiplexing manner. The space division multiplexing manner refers to a manner of transmitting data streams on a same time-frequency resource by using different spatial channels. In a process of transmitting data streams by the k UEs, a base station needs to send pilot signals to the k UEs respectively, so that after receiving a pilot signal, each UE may obtain equivalent channel information between the UE and the base station according to the pilot signal, and calculate, according to the equivalent channel information, a receive equalization vector and a data stream receiving gain that are used when the UE receives a data signal, so as to obtain a data stream of the UE by demodulating, according to the receive equalization vector and the data stream receiving gain, the data signal received by the UE, and complete transmission of the data stream.

The embodiments of the present invention provide a pilot signal generation method. According to the method, each UE may obtain equivalent channel information between the UE and a base station correctly when multiple UEs share a pilot, obtain a receive equalization vector and a data stream receiving gain that are used when the UE receives a data signal, and further obtain a data stream of the UE. That is, according to the method, multiple UEs may share a pilot while it is ensured that each of multiple UEs may correctly obtain a data stream, thereby reducing pilot overheads.

Embodiment 1

Figure 1:
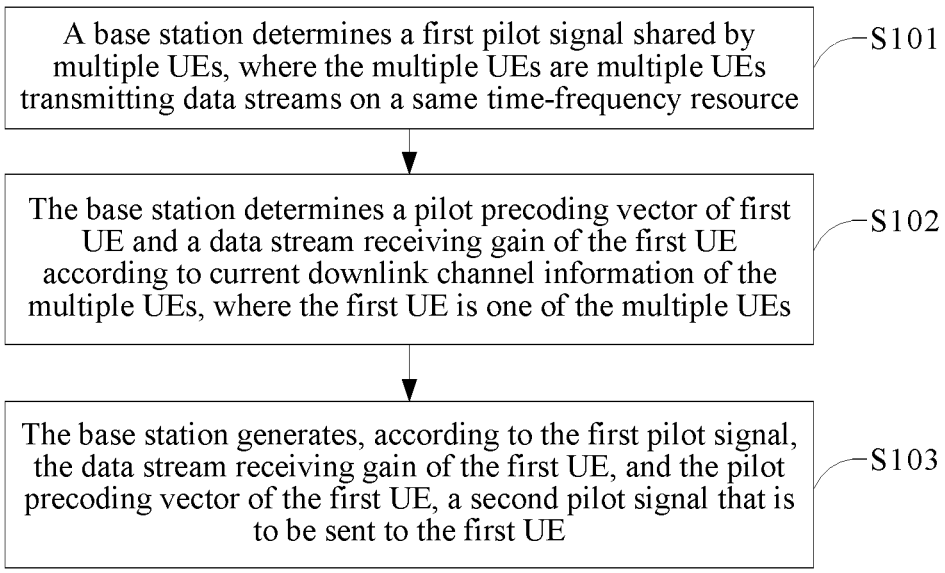
FIG. 1 is a flowchart 1 of a pilot signal generation method according to an embodiment of the present invention.

This embodiment of the present invention provides a pilot signal generation method. As shown in FIG. 1, the method may include:

S101: A base station determines a first pilot signal shared by multiple UEs, where the multiple UEs are multiple UEs transmitting data streams on a same time-frequency resource.

S102: The base station determines a pilot precoding vector of first UE and a data stream receiving gain of the first UE according to current downlink channel information of the multiple UEs, where the first UE is one of the multiple UEs.

S103: The base station generates, according to the first pilot signal, the data stream receiving gain of the first UE, and the pilot precoding vector of the first UE, a second pilot signal that is to be sent to the first UE.

In an MU-MIMO system, to enable each of multiple UEs transmitting data streams on a same time-frequency resource to correctly obtain, a data stream sent by a base station, the base station needs to send a pilot signal to each UE when sending a data stream to the UE, so that the UE can correctly obtain the data stream of the UE by demodulating a received data signal. In this embodiment of the present invention, the base station first allocates a same pilot signal to the multiple UEs, that is, the first pilot signal. The base station further determines the pilot precoding vector of the first UE and the data stream receiving gain of the first UE according to the current downlink channel information (including current downlink channel information of each of the multiple UEs) of the multiple UEs, and generates the second pilot signal that is to be sent to the first UE according to the pilot precoding vector of the first UE, the data stream receiving gain of the first UE, and the first pilot signal. Because the pilot signal allocated by the base station to each of the multiple UEs is the first pilot signal, pilot overloads may be reduced.

It should be noted that after receiving the second pilot signal, the first UE may obtain equivalent channel information (which is a product of the pilot precoding vector of the first UE, current downlink channel information of the first UE, and the data stream receiving gain of the first UE) between the first UE and the base station according to the second pilot signal. The first UE calculates, according to the obtained equivalent channel information, a receive equalization vector actually used when receiving a data signal and a data stream receiving gain actually used when receiving the data signal, so as to obtain a first data stream by demodulating the received data signal according to the receive equalization vector and the data stream receiving gain.

It should be noted that in S102, the pilot precoding vector of the first UE that is determined by the base station satisfies the following two conditions:

(1) a product of the pilot precoding vector of the first UE and current downlink channel information of each of UEs other than the first UE in the multiple UEs is zero; and (2) a product of the pilot precoding vector of the first UE and the current downlink channel information of the first UE is a receive equalization vector of the first UE.

For example, assuming that the base station transmits data streams to k (k=1, 2, . . . , k) UEs on a same time-frequency resource, if the $i^{th}$ UE (which may be represented as $UE_i$) in the k UEs is the first UE, current downlink channel information of $UE_i$ may be represented as $H_i$, a pilot precoding vector of $UE_i$ may be represented as $P_i^{pilot}$, and a receive equalization vector of $UE_i$ may be represented as $w_i$, the $j^{th}$ ($\forall j \neq i$, $j \in k$) UE in the k UEs may be represented as $UE_j$, and current downlink channel information of $UE_j$ may be represented as $H_j$. A first condition that $P_i^{pilot}$ needs to satisfy may be represented as: $H_j \cdot P_i^{pilot}=0$.

It should be noted that j indicates any integer from 1 to k except i. Therefore, a product of $P_i^{pilot}$ and current downlink channel information of each of the other UEs in the k UEs except $UE_i$ is zero, and may be represented by a formula $H_j \cdot P_i^{pilot}=0$.

A second condition that $P_i^{pilot}$ a needs to satisfy may be represented as: $w_i=H_i \cdot P_i^{pilot}$.

Figure 2:
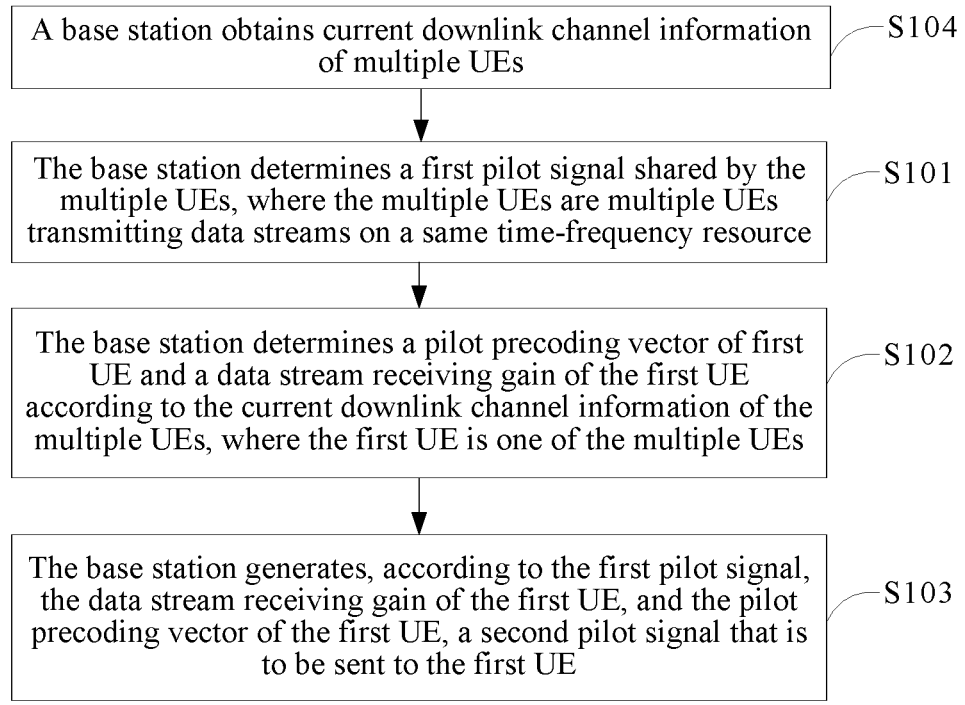
FIG. 2 is a flowchart 2 of a pilot signal generation method according to an embodiment of the present invention.

Optionally, as shown in FIG. 2, before S102 shown in FIG. 1, the method may further include:

S104: The base station obtains the current downlink channel information of the multiple UEs.

Specifically, the base station may obtain the current downlink channel information of each of the multiple UEs by receiving a downlink channel information feedback sent by each of the multiple UEs.

Alternatively, if an MU-MIMO system uses a time division duplex (English: time division duplex, TDD for short) mode, the base station may also obtain the current downlink channel information of each of the multiple UEs according to current uplink channel information of each of the multiple UEs by using a feature of the TDD mode that an uplink channel and a downlink channel are reciprocal (that is, a response of the uplink channel and a response of the downlink channel are the same).

It should be noted that in this embodiment of the present invention, S104 needs to be performed only before S102, and an execution order between S104 and S101 is not limited in this embodiment of the present invention.

Figure 3:
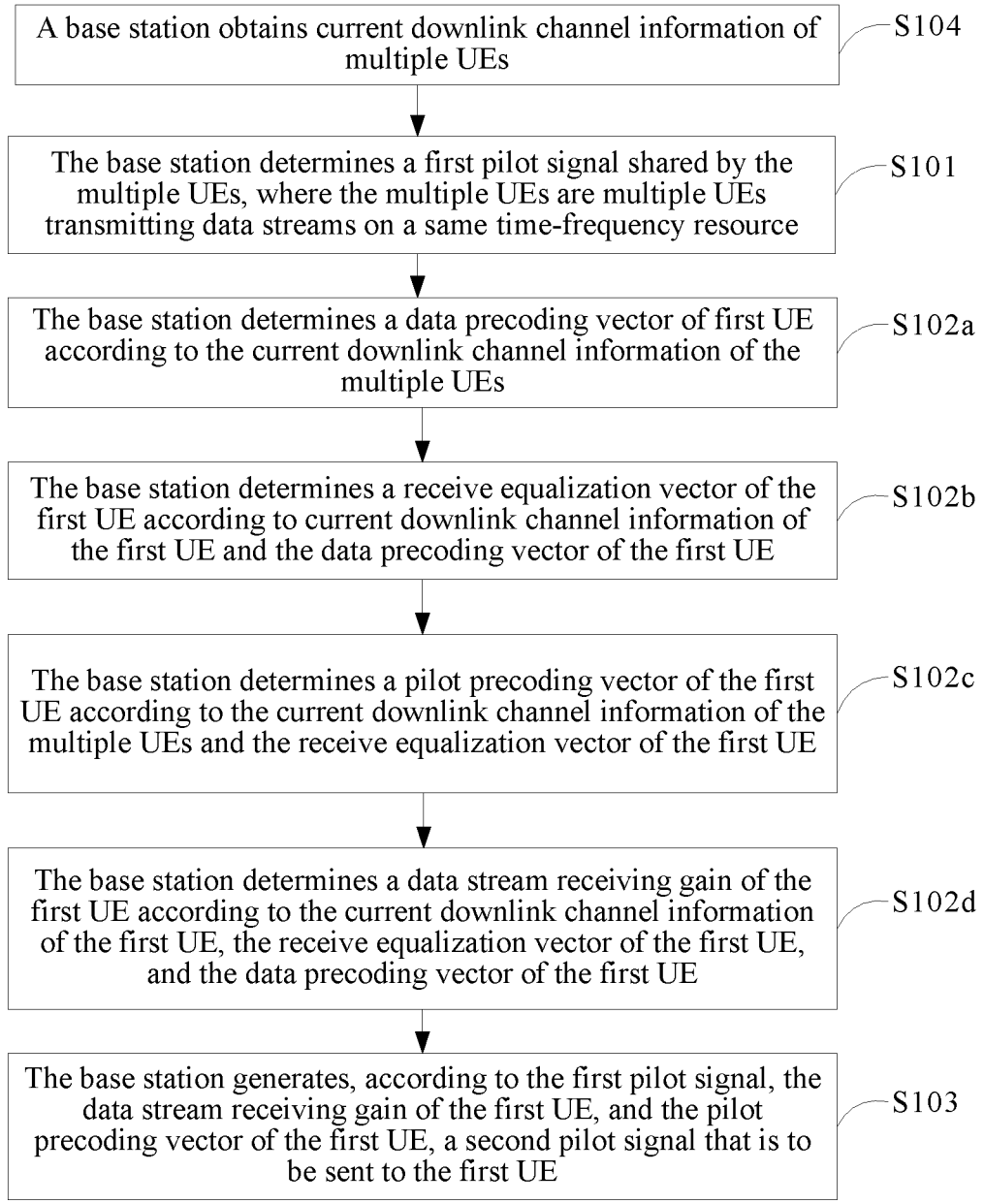
FIG. 3 is a flowchart 3 of a pilot signal generation method according to an embodiment of the present invention.

Optionally, as shown in FIG. 3, S102 shown in FIG. 2 may specifically include: S102*a*: The base station determines a data precoding vector of the first UE according to the current downlink channel information of the multiple UEs.

Optionally, the base station determines the data precoding vector of the first UE according to the current downlink channel information of the multiple UEs by using multiple algorithms. For example, the algorithms may include a linear precoding algorithm, a nonlinear precoding algorithm, and the like. The linear precoding algorithm may include a zero forcing (English: zero forcing, ZF for short) algorithm, a block diagonalization (English: block diagonalization, BD for short) algorithm, a signal to leakage plus noise ratio (English: signal to leakage plus noise ratio, SLNR for short) algorithm, and the like. The nonlinear precoding algorithm may include a dirty paper coding (English: dirty paper coding, DPC for short) algorithm, a vector perturbation (English: vector perturbation, VP for short) algorithm, and the like.

It should be noted that the foregoing algorithms for determining the data precoding vector of the first UE by the base station according to the current downlink channel information of the multiple UEs are merely examples. In this embodiment of the present invention, the algorithm for determining the data precoding vector of the first UE by the base station according to the current downlink channel information of the multiple UEs includes but is not limited to the foregoing several types, and any other algorithm for determining the data precoding vector of the first UE according to the current downlink channel information of the multiple UEs falls within the protection scope of the present invention.

It is assumed that a calculation process of determining the data precoding vector of the first UE by the base station according to the current downlink channel information of the multiple UEs by using the ZF algorithm is as follows:

$$[U_i D_i V_i] = svd(H_i); \qquad \text{formula (1)}$$

$$H_i^{eff} = (U_i(:,1))^H * H_i; \qquad \text{formula (2)}$$

$$\tilde{H} = [H_1^{eff}; H_2^{eff}; \ldots ; H_k^{eff}]; \qquad \text{formula (3)}$$

$$P = \tilde{H}(\tilde{H}\tilde{H}^H)^{-1}; \qquad \text{formula (4)}$$

$$P_i = P(:,i); \text{ and} \qquad \text{formula (5)}$$

$$P_i^{data} = \frac{P_i}{|P_i|}. \qquad \text{formula (6)}$$

In the calculation process, $H_i$ indicates current downlink channel information of $UE_i$ (that is, the first UE).

According to formula (1), singular value decomposition (English: singular value decomposition, SVD for short) is performed on $H_i$, to obtain a right singular vector matrix $V_i$, a left singular vector matrix $U_i$, and a singular value $D_i$ of $H_i$.

According to formula (2), a product $H_i^{eff}$ of a conjugate transpose $(U_i(:,1))^H$ of a first column vector of $U_i$ and $H_i$ is calculated.

According to formula (3), a matrix $\tilde{H}$ is calculated, where $\tilde{H}$ represents a matrix formed by arranging $H^{eff}$ (including $H_1^{eff}, H_2^{eff}, \ldots,$ and $H_k^{eff}$) of the multiple UEs (that is, k UEs transmitting data streams by using a same time-frequency resource) in rows.

According to formula (4), a pseudo-inverse matrix P of $\tilde{H}$ is calculated.

According to formula (5), the $i^{th}$ column vector $P_i$ of P is calculated.

Finally, according to formula (6), normalization processing is performed on $P_i$, that is, dividing $P_i$ by a modulus $|P_i|$ of $P_i$, to calculate $P_i^{data}$. $P_i^{data}$ is the data precoding vector of the first UE that is determined by the base station according to the current downlink channel information of the multiple UEs.

S102b: The base station determines a receive equalization vector of the first UE according to the current downlink channel information of the first UE and the data precoding vector of the first UE.

Specifically, the base station determines the receive equalization vector of the first UE according to the current downlink channel information of the first UE and the data precoding vector of the first UE by using multiple algorithms. For example, the algorithms may include a maximum ratio combining (English: maximum ratio combining, MRC for short) algorithm, a minimum mean-square error (English: minimum mean-square error, MMSE for short), and the like.

It should be noted that the algorithms for determining the receive equalization vector of the first UE by the base station according to the current downlink channel information of the first UE and the data precoding vector of the first UE are merely examples. In this embodiment of the present invention, the algorithm for determining the receive equalization vector of the first UE by the base station according to the current downlink channel information of the first UE and the data precoding vector of the first UE includes but is not limited to the foregoing several types, and any other algorithm for determining the receive equalization vector of the first UE by the base station according to the current downlink channel information of the first UE and the data precoding vector of the first UE falls within the protection scope of the present invention.

For example, assuming that the base station determines the receive equalization vector (which may be represented as $W_i$) of the first UE according to the data precoding vector (which may be represented as $P_i^{data}$) of the first UE and the current downlink channel information (which may be represented as $H_i$) of the first UE by using the MRC algorithm, a specific calculation formula is as follows:

$$w_i = \frac{H_i \cdot P_i^{data}}{\sqrt{\|H_i \cdot P_i^{data}\|_2^2}}. \qquad \text{formula (7)}$$

The base station may calculate $W_i$ according to formula (7). $\|H_i \cdot P_i^{data}\|_2^2$ represents a 2-norm of $H_i \cdot P_i^{data}$.

It should be noted that in this embodiment of the present invention, the receive equalization vector of the first UE is a receive equalization vector of the first UE that is calculated by the base station according to a preset algorithm for calculating a receive equalization vector. When the first UE receives a data signal, an actually-used algorithm for calculating a receive equalization vector may be the same as the algorithm preset by the base station, or may be different from the algorithm preset by the base station. Therefore, the receive equalization vector of the first UE that is determined by the base station may be a receive equalization vector actually used when the first UE receives the data signal, or may not be a receive equalization vector actually used when the first UE receives the data signal.

S102c: The base station determines the pilot precoding vector of the first UE according to the current downlink channel information of the multiple UEs and the receive equalization vector of the first UE.

Two conditions that the pilot precoding vector of the first UE needs to satisfy are:

(1) a product of the pilot precoding vector of the first UE and current downlink channel information of each of UEs other than the first UE in the multiple UEs is zero; and (2) a product of the pilot precoding vector of the first UE and the current downlink channel information of the first UE is the receive equalization vector of the first UE.

S102d: The base station determines the data stream receiving gain of the first UE according to the current downlink channel information of the first UE, the receive equalization vector of the first UE, and the data precoding vector of the first UE.

For example, a calculation formula for determining the data stream receiving gain (which may be represented as $\beta_i$) of the first UE by the base station according to the current downlink channel information (which may be represented as $H_i$) of the first UE, the receive equalization vector (which may be represented as $w_i$) of the first UE, and the data precoding vector (which may be represented as $P_i^{data}$) of the first UE is as follows:

$$\beta_i = w_i^H \cdot H_i \cdot P_i^{data} \qquad \text{formula (8)}.$$

The base station may calculate $\beta_i$ according to formula (8), where $w_i^H$ is a conjugate transpose of $w_i$.

It should be noted that in this embodiment of the present invention, the data stream receiving gain of the first UE is the data stream receiving gain determined by the base station according to the data precoding vector of the first UE and the receive equalization vector of the first UE that is determined by the base station.

Further, in S102c, the base station determines the pilot precoding vector of the first UE according to the current downlink channel information of the multiple UEs and the receive equalization vector of the first UE by using multiple algorithms. The following provides an optional algorithm for describing S102c in detail.

Figure 4:
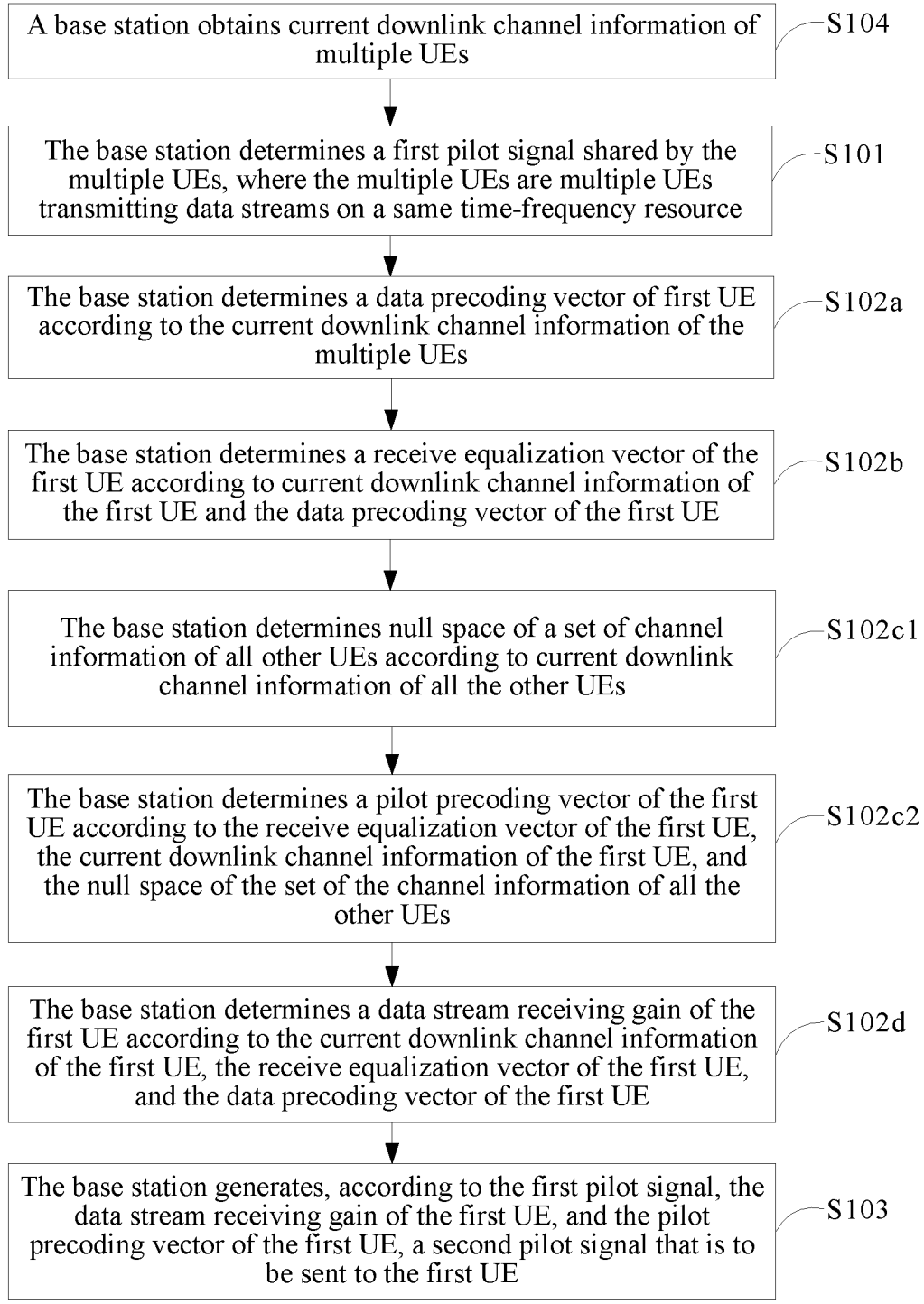
FIG. 4 is a flowchart 4 of a pilot signal generation method according to an embodiment of the present invention.

Optionally, as shown in FIG. 4, S102c shown in FIG. 3 may specifically include:

S102c1: The base station determines null space of a set of channel information of all the other UEs according to current downlink channel information of all the other UEs.

The other UEs refer to UEs other than the first UE in the multiple UEs.

For example, a calculation process of determining the null space (which may be represented as $V_{-i}^{(0)}$) of the set of the channel information of all the other UEs by the base station is as follows:

$$H_{-i} = [H_1 \ldots H_{i-1} H_{i+1} \ldots H_k]^H \qquad \text{formula (9); and}$$

$$H_{-i} = U_{-i} D_{-i} [V_{-i}^{(i)} V_{-i}^{(0)}]^H \qquad \text{formula (10)}.$$

In the calculation process, the base station calculates the set $H_{-i}$ of the channel information of all the other UEs according to formula (9), where indicates an integer set from 1 to k except $i$. For example, it may be understood that $UE_{-i}$ is a set of all the other UEs in the multiple UEs (that is, k UEs transmitting data streams on a same time-frequency resource) except $UE_i$ (that is, the first UE).

The base station calculates the null space $V_{-i}^{(0)}$ of $H_{-i}$ according to formula (10). $V_{-i}^{(0)}$ may ensure that a product of $V_{-i}^{(0)}$ and channel information of the $i^{th}$ user is not zero, and a product of $V_{-i}^{(0)}$ and channel information $H_j$ of any other user other than the $i^{th}$ user is zero, that is, $H_i \cdot V_{-i}^{(0)} \neq 0$ and $H_j \cdot V_{-i}^{(0)} = 0$.

S102c2: The base station determines the pilot precoding vector of the first UE according to the receive equalization vector of the first UE, the current downlink channel information of the first UE, and the null space of the set of the channel information of all the other UEs.

For example, a calculation process of determining the pilot precoding vector (which may be represented as $P_i^{pilot}$) of the first UE by the base station according to $w_i$, $H_i$, and $V_{-i}^{(0)}$ is as follows:

$$P_i^* = (H_i \cdot V_{-i}^{(0)})^H \left((H_i \cdot V_{-i}^{(0)}) \cdot (H_i \cdot V_{-i}^{(0)})^H\right)^{-1} \cdot w_i; \text{ and} \quad \text{formula (11)}$$

$$P_i^{pilot} = V_{-i}^{(0)} \cdot P_i^*. \quad \text{formula (12)}$$

In the calculation process, the base station may calculate a vector $P_i^*$ according to formula (10). $P_i^*$ may ensure that a product of $P_i^*$, $H_i$, and $V_{-i}^{(0)}$ is $w_i$, that is, $w_i = H_i \cdot V_{-i}^{(0)} \cdot P_i^*$.

The base station may calculate $P_i^{pilot}$ according to formula (12).

In this case, the base station may determine the pilot precoding vector (which may be represented as $P_i^{pilot}$) of the first UE by using the method in S102c1 and S102c2 according to the receive equalization vector (which may be represented as $w_i$) of the first UE, the current downlink channel information (which may be represented as $H_i$) of the first UE, and the null space (which may be represented as $V_{-i}^{(0)}$) of the set of the channel information of all UEs other than the first UE in the multiple UEs.

It should be noted that because $H_j \cdot V_{-i}^{(0)} = 0$, $H_j \cdot V_{-i}^{(0)} \cdot P_j^* = 0$; and because $p_i^{pilot} = V_{-i}^{(0)} \cdot P_i^*$, $H_j \cdot P_i^{pilot} = H_j \cdot V_{-i}^{(0)} \cdot P_i^*$ and $H_j \cdot P_i^{pilot} = 0$. Therefore, $P_i^{pilot}$ determined by the base station satisfies the condition (1). Because $w_i = H_i \cdot V_{-i}^{(0)} \cdot P_i^*$, and $P_i^{pilot} = V_{-i}^{(0)} \cdot P_i^*$, $w_i = H_i \cdot P_i^{pilot}$. Therefore, $P_i^{pilot}$ determined by the base station satisfies the condition (2).

Further, S103, that is, a method for generating, according to the first pilot signal, the data stream receiving gain of the first UE, and the pilot precoding vector of the first UE, the second pilot signal that is to be sent to the first UE may be:

A formula for generating, by the base station according to $P_i^{pilot}$, $\beta_i$, and the first pilot signal (which may be represented as $s^{pilot}$), the second pilot signal (which may be represented as $y_i^{pilot}$) that is to be sent to the first UE is shown as follows:

$$y_i^{pilot} = P_i^{pilot} \cdot \beta_i \cdot s^{pilot} \quad \text{formula (13)}.$$

It should be noted that the base station may determine, according to the method in S101 to S104, the first pilot signal shared by the multiple UEs transmitting data streams on a same time-frequency resource, pilot precoding vectors (including $P_1^{pilot}, P_2^{pilot}, \ldots,$ and $P_k^{pilot}$) of all the multiple UEs, and data stream receiving gains (including $\beta_1, \beta_2, \ldots,$ and $\beta_k$) of all the multiple UEs. Finally, the base station respectively obtains second pilot signals (including $y_1^{pilot}, y_2^{pilot}, \ldots,$ and $y_k^{pilot}$) of all the multiple UEs after respectively multiplying the first pilot signal by the pilot precoding vectors of all the multiple UEs and the data stream receiving gains of all the multiple UEs according to formula (13). In the method of S101 to S104, the base station allocates the same first pilot signal to the multiple UEs transmitting data streams on a same time-frequency resource. Therefore, the multiple UE can share a pilot, thereby saving pilot overheads.

Further, after generating, by using the pilot signal generation method provided in the foregoing embodiment, the second pilot signal that is to be sent to the first UE, the base station needs to send the second pilot signal to the first UE by using a current downlink channel of the first UE.

Figure 5:
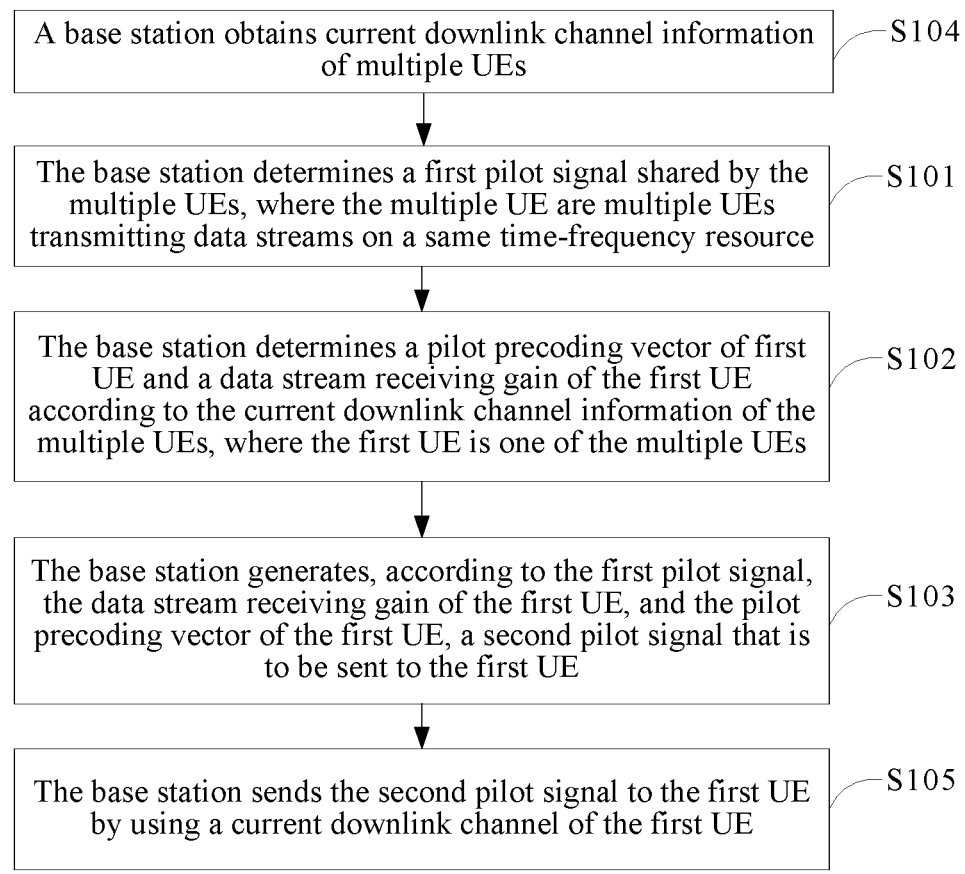
FIG. 5 is a flowchart 5 of a pilot signal generation method according to an embodiment of the present invention.

For example, with reference to FIG. 2, as shown in FIG. 5, the pilot signal generation method provided in this embodiment of the present invention may further include:

S105: The base station sends the second pilot signal to the first UE by using a current downlink channel of the first UE.

Figure 6:
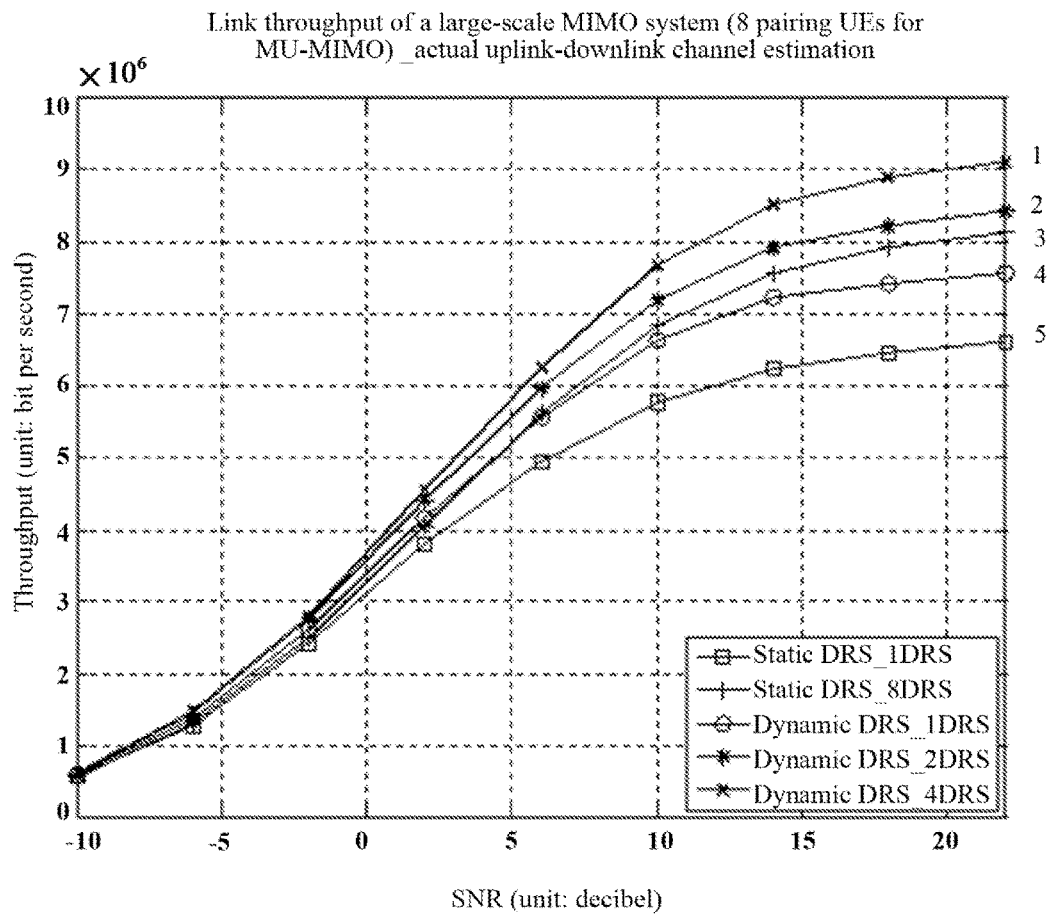
FIG. 6 is a simulation diagram of a system capacity according to an embodiment of the present invention.

As shown in FIG. 6, FIG. 6 shows a simulation result of a system capacity obtained after the second pilot signal is applied to an MU-MIMO system, after the second pilot signal is obtained by using the pilot signal generation method provided in this embodiment of the present invention. A horizontal coordinate shown in FIG. 6 indicates a signal to noise ratio (English: signal to noise ratio, SNR for short), and a unit of the SNR is decibel (a symbol of the unit is dB). A vertical coordinate shown in FIG. 6 indicates a throughput (English: throughput), and a unit of the throughput is bit per second (a symbol of the unit is bps). It can be seen from FIG. 6 that in a comparison between the simulation result (a curve 1 shown in FIG. 6) obtained by using the pilot signal generation method provided in this embodiment of the present invention and a simulation result (a curve 3 shown in FIG. 6) obtained by using a pilot signal generation method provided by an existing technology, an MU-MIMO system can obtain a higher throughput by using the pilot signal generation method provided in this embodiment of the present invention.

This embodiment of the present invention provides a pilot signal generation method. The method specifically includes: determining, by a base station, a first pilot signal shared by multiple UEs, where the multiple UEs are multiple UEs transmitting data streams on a same time-frequency resource; determining a pilot precoding vector of first UE and a data stream receiving gain of the first UE according to current downlink channel information of the multiple UEs, where the first UE is one of the multiple UEs; and generating, by the base station according to the first pilot signal, the data stream receiving gain of the first UE, and the pilot precoding vector of the first UE, a second pilot signal that is to be sent to the first UE. According to the method, when multiple UEs transmitting data streams on a same time-frequency resource share a pilot, each UE is not interfered, when receiving a pilot signal of the UE, by a pilot signal of another UE, thereby ensuring that each of the multiple UEs can correctly obtain, according to the pilot signal of the UE, a data stream of the UE, implementing sharing of one pilot by the multiple UEs, and further reducing pilot overheads.

Embodiment 2

Figure 7:
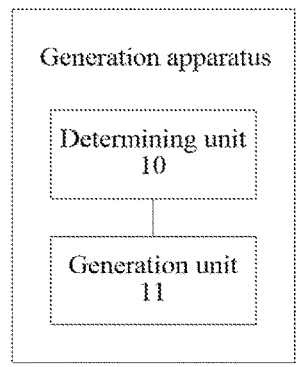
FIG. 7 is a schematic structural diagram 1 of a pilot signal generation apparatus according to an embodiment of the present invention.

This embodiment of the present invention provides a pilot signal generation apparatus. As shown in FIG. 7, the generation apparatus includes:

a determining unit 10, configured to: determine a first pilot signal shared by multiple user equipments UEs, where the multiple UEs are multiple UEs transmitting data streams on a same time-frequency resource; and determine a pilot precoding vector of first UE and a data stream receiving gain of the first UE according to current downlink channel information of the multiple UEs, where the first UE is one of the multiple UEs; and a generation unit 11, configured to generate, according to the first pilot signal, the data stream receiving gain of the first UE, and the pilot precoding vector of the first UE that are determined by the determining unit 10, a second pilot signal that is to be sent to the first UE.

Optionally, the pilot precoding vector of the first UE that is determined by the determining unit 10 satisfies the following conditions:

a product of the pilot precoding vector of the first UE and current downlink channel information of each of UEs other than the first UE in the multiple UEs is zero; and a product of the pilot precoding vector of the first UE and current downlink channel information of the first UE is a receive equalization vector of the first UE.

Figure 8:
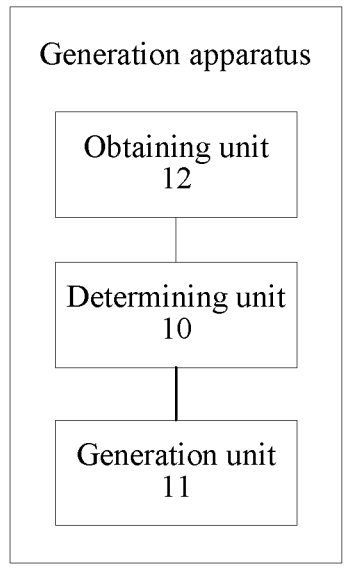
FIG. 8 is a schematic structural diagram 2 of a pilot signal generation apparatus according to an embodiment of the present invention.

Optionally, with reference to FIG. 7, as shown in FIG. 8, the generation apparatus further includes an obtaining unit 12, where the obtaining unit 12 is configured to obtain the current downlink channel information of the multiple UEs; and the determining unit 10 is specifically configured to: determine a data precoding vector of the first UE according to the current downlink channel information of the multiple UEs that is obtained by the obtaining unit 12; determine the receive equalization vector of the first UE according to the current downlink channel information of the first UE and the data precoding vector of the first UE; determine the pilot precoding vector of the first UE according to the current downlink channel information of the multiple UEs and the receive equalization vector of the first UE; and determine the data stream receiving gain of the first UE according to the current downlink channel information of the first UE, the receive equalization vector of the first UE, and the data precoding vector of the first UE.

Optionally, the determining unit 10 is specifically configured to: determine null space of a set of channel information of all the other UEs according to current downlink channel information of all the other UEs; and determine the pilot precoding vector of the first UE according to the receive equalization vector of the first UE, the current downlink channel information of the first UE, and the null space of the set of the channel information of all the other UEs.

Figure 9:
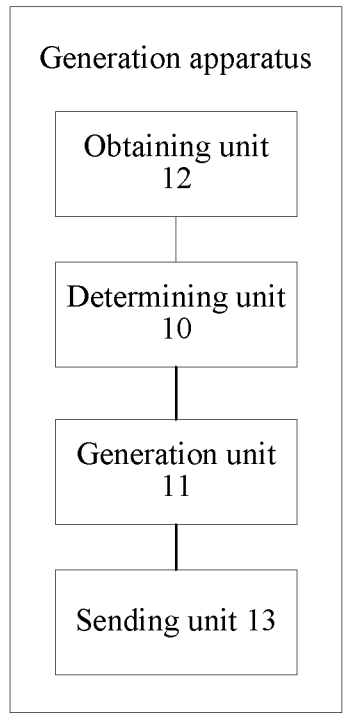
FIG. 9 is a schematic structural diagram 3 of a pilot signal generation apparatus according to an embodiment of the present invention.

Optionally, with reference to FIG. 8, as shown in FIG. 9, the generation apparatus further includes:

a sending unit 13, configured to send, after the generation unit 11 generates the second pilot signal, the second pilot signal generated by the generation unit 11 to the first UE by using a current downlink channel of the first UE.

It should be noted that the pilot signal generation apparatus provided in this embodiment of the present invention may be a base station.

This embodiment of the present invention provides a pilot signal generation apparatus. The generation apparatus may determine a first pilot signal shared by multiple UEs, where the multiple UEs are multiple UEs transmitting data streams on a same time-frequency resource; determine a pilot precoding vector of first UE and a data stream receiving gain of the first UE according to current downlink channel information of the multiple UEs, where the first UE is one of the multiple UEs; and generate, according to the first pilot signal, the data stream receiving gain of the first UE, and the pilot precoding vector of the first UE, a second pilot signal that is to be sent to the first UE. According to the generation apparatus, when multiple UEs transmitting data streams on a same time-frequency resource share a pilot, each UE is not interfered, when receiving a pilot signal of the UE, by a pilot signal of another UE, thereby ensuring that each of the multiple UEs can correctly obtain, according to the pilot signal of the UE, a data stream of the UE, implementing sharing of one pilot by the multiple UEs, and further reducing pilot overheads.

Embodiment 3

Figure 10:
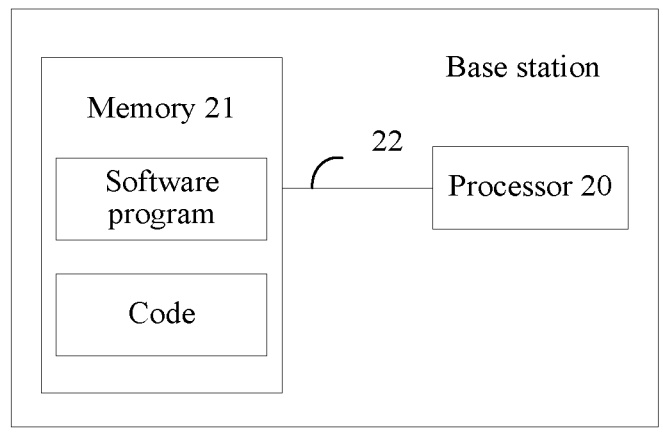
FIG. 10 is a schematic diagram 1 of a hardware structure of a base station according to an embodiment of the present invention.

As shown in FIG. 10, this embodiment of the present invention provides a base station. The base station may include: a processor 20, a memory 21, and a system bus 22. The processor 20 is connected to the memory 21 by using the system bus 22, and communication between the processor 20 and the memory 21 is completed by using the system bus 22.

The processor 21 may be a central processing unit (English: central processing unit, CPU for short), or an application-specific integrated circuit (English: application-specific integrated circuit, ASIC for short), or one or more integrated circuits configured to implement the embodiments of the present invention.

The memory 21 may include a volatile memory (English: volatile memory), for example, a random-access memory (English: random-access memory, RAM for short). Alternatively, the memory 21 may include a non-volatile memory (English: non-volatile memory), for example, a read-only memory (English: read-only memory, ROM for short), a flash memory (English: flash memory), a hard disk drive (English: hard disk drive, HDD for short), or a solid-state drive (English: solid-state drive, SSD for short). Alternatively, the memory 21 may include a combination of the foregoing memories.

When the base station runs, the processor 20 and the memory 21 may execute the procedure of the method in any one of FIG. 1 to FIG. 5, and the following is specifically included:

The processor 20 is configured to: determine a first pilot signal shared by multiple user equipments UEs, where the multiple UEs are multiple UEs transmitting data streams on a same time-frequency resource; determine a pilot precoding vector of first UE and a data stream receiving gain of the first UE according to current downlink channel information of the multiple UEs, where the first UE is one of the multiple UEs; and generate, according to the first pilot signal, the data stream receiving gain of the first UE, and the pilot precoding vector of the first UE, a second pilot signal that is to be sent to the first UE. The memory 21 is configured to store code of the first pilot signal, code of the current downlink channel information of the multiple UEs, code of the pilot precoding vector of the first UE, code of the data stream receiving gain of the first UE, code of the second pilot signal, and a software program for controlling the processor 20 to complete the foregoing process, so that the processor 20 completes the foregoing process by executing the software program and calling the code of the first pilot signal, the code of the current downlink channel information of the multiple UEs, the code of the pilot precoding vector of the first UE, the code of the data stream receiving gain of the first UE, and the code of the second pilot signal.

Optionally, the pilot precoding vector of the first UE that is determined by the processor 20 satisfies the following conditions:

a product of the pilot precoding vector of the first UE and current downlink channel information of each of UEs other than the first UE in the multiple UEs is zero; and a product of the pilot precoding vector of the first UE and current downlink channel information of the first UE is a receive equalization vector of the first UE.

Optionally, the processor 20 is specifically configured to: obtain the current downlink channel information of the multiple UEs; determine a data precoding vector of the first UE according to the current downlink channel information of the multiple UEs; determine the receive equalization vector of the first UE according to the current downlink channel information of the first UE and the data precoding vector of the first UE; determine the pilot precoding vector of the first UE according to the current downlink channel information of the multiple UEs and the receive equalization vector of the first UE; and determine the data stream receiving gain of the first UE according to the current downlink channel information of the first UE, the receive equalization vector of the first UE, and the data precoding vector of the first UE.

Optionally, the processor 20 is specifically configured to: determine null space of a set of channel information of all the other UEs according to current downlink channel information of all the other UEs; and determine the pilot precoding vector of the first UE according to the receive equalization vector of the first UE, the current downlink channel information of the first UE, and the null space of the set of the channel information of all the other UEs.

Figure 11:
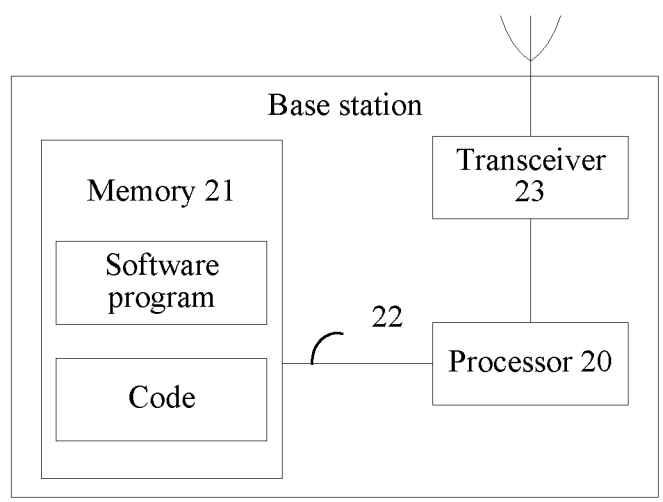
FIG. 11 is a schematic diagram 2 of a hardware structure of a base station according to an embodiment of the present invention.

Optionally, with reference to FIG. 10, as shown in FIG. 11, the base station further includes a transceiver 23.

The transceiver 23 is configured to send, after the processor 20 generates the second pilot signal, the second pilot signal generated by the processor 20 to the first UE by using a current downlink channel of the first UE.

The transceiver 23 may be a module that integrates a transmitter and a receiver and that has receiving and transmitting functions, or may be a module having an independent transmitter and an independent receiver.

This embodiment of the present invention provides a base station. The base station may determine a first pilot signal shared by multiple UEs, where the multiple UEs are multiple UEs transmitting data streams on a same time-frequency resource; determine a pilot precoding vector of first UE and a data stream receiving gain of the first UE according to current downlink channel information of the multiple UEs, where the first UE is one of the multiple UEs; and generate, according to the first pilot signal, the data stream receiving gain of the first UE, and the pilot precoding vector of the first UE, a second pilot signal that is to be sent to the first UE. According to the base station, when multiple UEs transmitting data streams on a same time-frequency resource share a pilot, each UE is not interfered, when receiving a pilot signal of the UE, by a pilot signal of another UE, thereby ensuring that each of the multiple UEs can correctly obtain, according to the pilot signal of the UE, a data stream of the UE, implementing sharing of one pilot by the multiple UEs, and further reducing pilot overheads.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of pilot signal generation, comprising:
   determining a first pilot signal shared by multiple user equipments (UEs), wherein the multiple UEs are multiple UEs transmitting data streams on a same time-frequency resource;
   obtaining current downlink channel information of the multiple UEs;
   determining a pilot precoding vector of a first UE and a data stream receiving gain of the first UE according to the current downlink channel information of the multiple UEs, wherein the first UE is one of the multiple UEs, the determining a pilot precoding vector of first UE and a data stream receiving gain of the first UE according to the current downlink channel information of the multiple UEs comprising:
      determining a data precoding vector of the first UE according to the current downlink channel information of the multiple UEs;
      determining the receive equalization vector of the first UE according to the current downlink channel information of the first UE and the data precoding vector of the first UE;

determining the pilot precoding vector of the first UE according to the current downlink channel information of the multiple UEs and the receive equalization vector of the first UE; and determining the data stream receiving gain of the first UE according to the current downlink channel information of the first UE, the receive equalization vector of the first UE, and the data precoding vector of the first UE; and generating, according to the first pilot signal, the data stream receiving gain of the first UE, and the pilot precoding vector of the first UE, a second pilot signal that is to be sent to the first UE, wherein the pilot precoding vector of the first UE satisfies the following conditions:

a product of the pilot precoding vector of the first UE and the current downlink channel information of each of UEs other than the first UE in the multiple UEs is zero; and a product of the pilot precoding vector of the first UE and the current downlink channel information of the first UE is a receive equalization vector of the first UE.

2. The method according to claim 1, wherein the determining the pilot precoding vector of the first UE according to the current downlink channel information of the multiple UEs and the receive equalization vector of the first UE comprises:

determining null space of a set of channel information of all the other UEs according to the current downlink channel information of all the other UEs; and determining the pilot precoding vector of the first UE according to the receive equalization vector of the first UE, the current downlink channel information of the first UE, and the null space of the set of the channel information of all the other UEs.

3. The method according to claim 1, wherein after the generating, according to the first pilot signal, the data stream receiving gain of the first UE, and the pilot precoding vector of the first UE, a second pilot signal that is to be sent to the first UE, the method further comprises:

sending the second pilot signal to the first UE by using a current downlink channel of the first UE.

4. A pilot signal generation apparatus, comprising:
a memory to store instructions; and
a processor to execute the instructions to cause the pilot signal generation apparatus to:
determine a first pilot signal shared by multiple user equipments (UEs), wherein the multiple UEs are multiple UEs transmitting data streams on a same time-frequency resource;
obtain current downlink channel information of the multiple UEs;
determine a pilot precoding vector of first UE and a data stream receiving gain of the first UE according to the current downlink channel information of the multiple UEs, wherein the first UE is one of the multiple UEs, comprising:
determine a data precoding vector of the first UE according to the current downlink channel information of the multiple UEs obtained by the pilot signal generation apparatus;
determine the receive equalization vector of the first UE according to the current downlink channel information of the first UE and the data precoding vector of the first UE;

determine the pilot precoding vector of the first UE according to the current downlink channel information of the multiple UEs and the receive equalization vector of the first UE; and determine the data stream receiving gain of the first UE according to the current downlink channel information of the first UE, the receive equalization vector of the first UE, and the data preceding vector of the first UE; and generate, according to the first pilot signal, the data stream receiving gain of the first UE, and the pilot precoding vector of the first UE that are determined by the determining unit, a second pilot signal that is to be sent to the first UE, wherein the pilot precoding vector of the first UE that is determined by the determining unit satisfies the following conditions:

a product of the pilot precoding vector of the first UE and the current downlink channel information of each of UEs other than the first UE in the multiple UEs is zero; and a product of the pilot precoding vector of the first UE and the current downlink channel information of the first UE is a receive equalization vector of the first UE.

5. The pilot signal generation apparatus according to claim 4, wherein the processor further executes the instructions to configure the pilot signal generation apparatus to: determine null space of a set of channel information of all the other UEs according to the current downlink channel information of all the other UEs; and determine the pilot precoding vector of the first UE according to the receive equalization vector of the first UE, the current downlink channel information of the first UE, and the null space of the set of the channel information of all the other UEs.

6. The pilot signal generation apparatus according to claim 4, wherein the processor further executes the instructions to configure the generation apparatus to configure the pilot signal generation apparatus to send, after the generation pilot signal apparatus generates the second pilot signal, the second pilot signal generated by the generation pilot signal apparatus to the first UE by using a current downlink channel of the first UE.

7. A base station, comprising:
a processor, configured to:
determine a first pilot signal shared by multiple user equipments (UEs), wherein the multiple UEs are multiple UEs transmitting data streams on a same time-frequency resource;
obtain current downlink channel information of the multiple UEs;
determine a data precoding vector of the first UE according to the current downlink channel information of the multiple UEs;
determine a pilot precoding vector of first UE and a data stream receiving gain of the first UE according to the current downlink channel information of the multiple UEs, wherein the first UE is one of the multiple UEs, comprising:
determine the receive equalization vector of the first UE according to the current downlink channel information of the first UE and the data precoding vectorof the first UE;
determine the pilot precoding vector of the first UE according to the current downlink channel information of the multiple UEs and the receive equalization vector of the first UE; and determine the data stream receiving gain of the first UE according to the current downlink channel information of the first UE, the receive equalization vector of the first UE, and the data precoding vector of the first UE; and generate, according to the first pilot signal, the data stream receiving gain of the first UE, and the pilot precoding vector of the first UE, a second pilot signal that is to be sent to the first UE, wherein the pilot precoding vector of the first UE that is determined by the processor satisfies the following conditions:

a product of the pilot precoding vector of the first UE and the current downlink channel information of each of UEs other than the first UE in the multiple UEs is zero; and a product of the pilot precoding vector of the first UE and the current downlink channel information of the first UE is a receive equalization vector of the first UE.

8. The base station according to claim 7, wherein the processor is configured to: determine null space of a set of channel information of all the other UEs according to the current downlink channel information of all the other UEs; and determine the pilot precoding vector of the first UE according to the receive equalization vector of the first UE, the current downlink channel information of the first UE, and the null space of the set of the channel information of all the other UEs.

9. The base station according to claim 7, wherein the base station further comprises a transceiver, wherein the transceiver is configured to send, after the processor generates the second pilot signal, the second pilot signal generated by the processor to the first UE by using a current downlink channel of the first UE.

* * * * *

UNITED STATES PATENT AND TRADEMARK OFFICE
CERTIFICATE OF CORRECTION

PATENT NO. : 10,404,435 B2
APPLICATION NO. : 15/603626
DATED : September 3, 2019
INVENTOR(S) : Jing Qiu et al.

Page 1 of 1

It is certified that error appears in the above-identified patent and that said Letters Patent is hereby corrected as shown below:

In the Claims

Column 18, Line 8:
In Claim 4, after "data" delete "preceding" and insert -- precoding --, therefor.

Column 18, Line 63 (approx.):
In Claim 7, after "precoding" delete "vectorof" and insert -- vector of --, therefor.

Signed and Sealed this
Thirty-first Day of December, 2019

Andrei Iancu
*Director of the United States Patent and Trademark Office*